(12) United States Patent
Yeh et al.

(10) Patent No.: US 8,908,014 B2
(45) Date of Patent: *Dec. 9, 2014

(54) OPTICAL IMAGING LENS SYSTEM WITH DOUBLE OPTICAL PATHS

(75) Inventors: Yen Ting Yeh, Taichung (TW); Min Che Li, Taichung (TW); Shing Chia Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 996 days.

This patent is subject to a terminal disclaimer.

(21) Appl. No.: 13/009,562

(22) Filed: Jan. 19, 2011

(65) Prior Publication Data

US 2012/0086787 A1    Apr. 12, 2012

(30) Foreign Application Priority Data

Oct. 6, 2010    (TW) .............................. 99133979 A

(51) Int. Cl.
 H04N 13/02    (2006.01)
(52) U.S. Cl.
 CPC .................................. *H04N 13/021* (2013.01)
 USPC ....................................................... 348/49
(58) Field of Classification Search
 USPC ..................................... 348/42, 49
 See application file for complete search history.

(56) References Cited

U.S. PATENT DOCUMENTS

| 2001/0030682 A1 | 10/2001 | Tserkovnyuk et al. |
| 2003/0002150 A1* | 1/2003 | Obama ......................... 359/431 |
| 2007/0091272 A1* | 4/2007 | Lerner et al. ..................... 353/31 |
| 2009/0015917 A1* | 1/2009 | Iwamoto et al. ............... 359/462 |
| 2012/0147196 A1* | 6/2012 | Lin et al. ........................ 348/187 |

FOREIGN PATENT DOCUMENTS

| CN | 1734597 A | 2/2006 |
| CN | 200968933 Y | 10/2007 |
| CN | 201405164 Y | 2/2010 |

* cited by examiner

*Primary Examiner* — Nhon Diep
(74) *Attorney, Agent, or Firm* — Tim Tingkang Xia, Esq.; Morris, Manning & Martin, LLP

(57) ABSTRACT

The present invention provides an optical imaging lens system with double optical paths, comprising: the first optical subsystem; the second optical subsystem having a back focal length equal to that of the first optical subsystem; an optical path selector selectively having a light reflection state or a light passing state; the first reflector set disposed at an image side of the first optical subsystem for directing light from the first optical subsystem to the optical path selector; and the second reflector set disposed at an image side of the second optical subsystem for directing light from the second optical subsystem to the optical path selector. In the present invention, the optical path selector can be controlled to have the light reflection state or the light passing state selectively, so that an image coming from the first optical subsystem or from the second optical subsystem is captured.

7 Claims, 8 Drawing Sheets

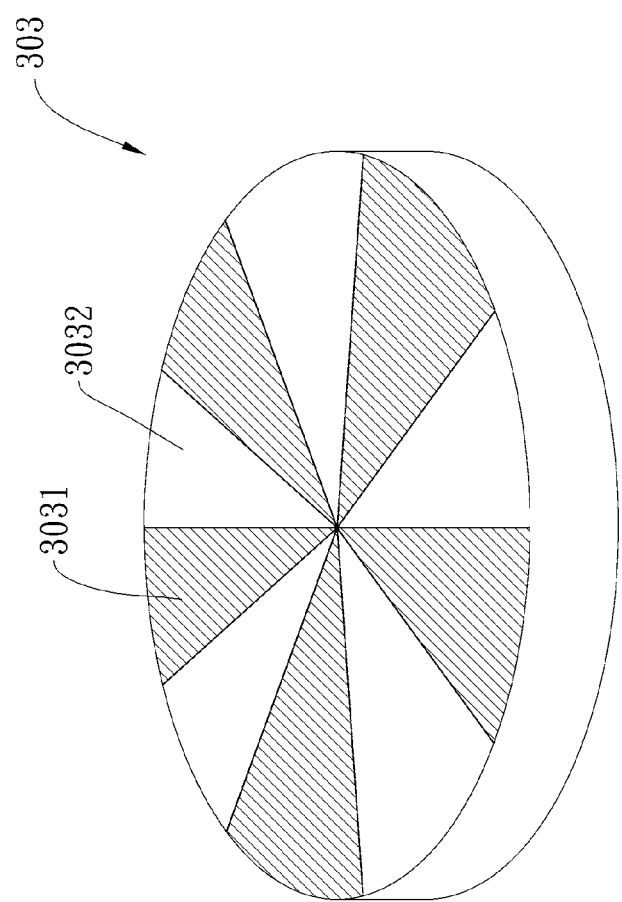

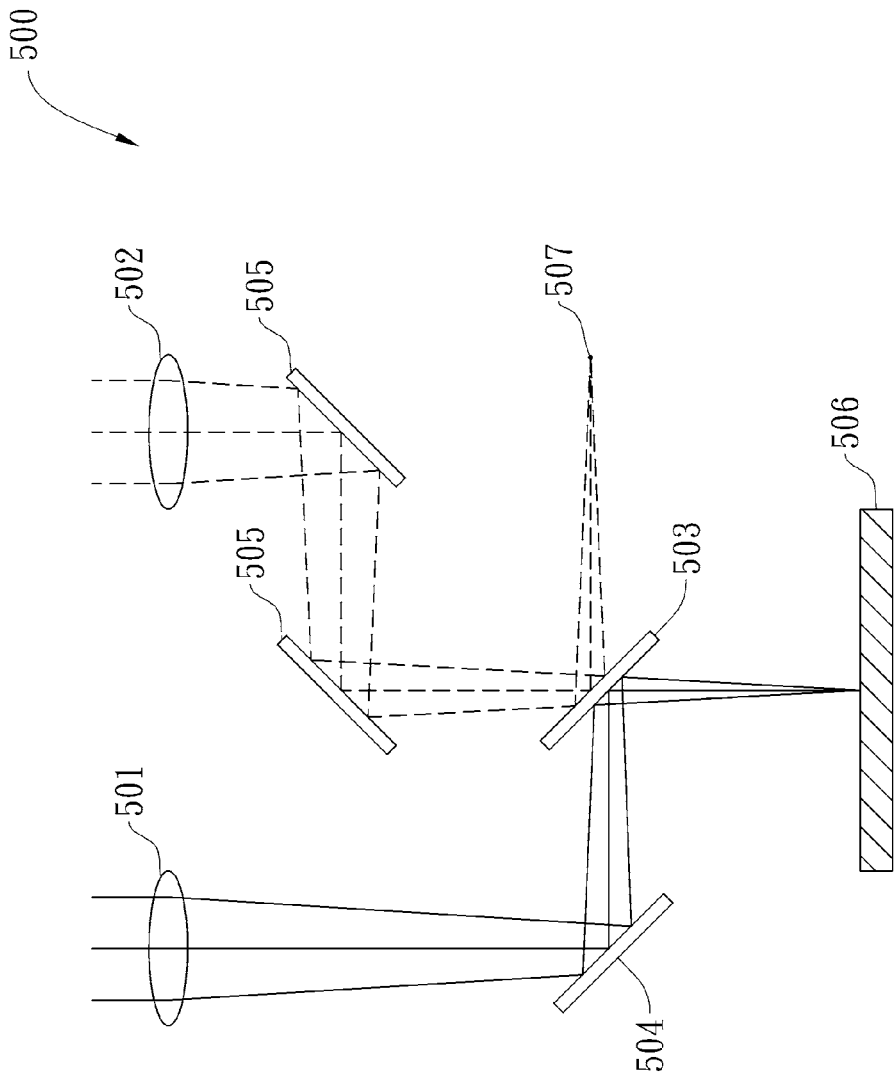

OPTICAL IMAGING LENS SYSTEM WITH DOUBLE OPTICAL PATHS

CROSS-REFERENCE TO RELATED APPLICATIONS

This non-provisional application claims priority under 35 U.S.C. §119(a) on Patent Application No(s). 099133979 filed in Taiwan, R.O.C. on Oct. 6, 2010, the entire contents of which are hereby incorporated by reference.

BACKGROUND OF THE INVENTION

1. Field of the Invention

The present invention relates to an optical imaging lens system with double optical paths, and more particularly, to an optical imaging lens system which is able to record images from different optical subsystems in alternating order.

2. Description of the Prior Art

Humans have the ability to see three-dimensional (3-D) images because our eyes are situated separately, and we see things with each eye taking a slightly different image. The brain unites the different images taken from each eye and produces a 3-D picture that we perceive.

In recent years, with the popularity of 3-D films, the demand for 3-D imaging lens systems is gradually increasing. A 3-D imaging lens system generally uses two lenses to separately take left-eye images and right-eye images, and then record those images to a medium in sequential or alternating order. More specifically, a conventional 3-D imaging lens system respectively retrieves images from the two different lenses in accordance with synchronization signals; the images are then sent to an image mixer and processed by the system. A conventional optical imaging lens system which records images from different lenses in sequential or alternating order thus constitutes a complex device requiring a high production cost; U.S. Patent Application No. 2001/0030682 serves as one such example.

Therefore, a need exists in the art for an optical imaging lens system which has a lowered production cost and which is able to effectively record images from different lenses to a sensor in sequential or alternating order.

SUMMARY OF THE INVENTION

An object of the present invention is to provide an optical imaging lens system which has a lowered production cost and which is able to effectively record images from different lenses to a sensor in sequential or alternating order.

To achieve the above object, the present invention provides an optical imaging lens system with double optical paths, comprising: the first optical subsystem; the second optical subsystem having a back focal length equal to that of the first optical subsystem; an optical path selector selectively having a light reflection state or a light passing state; the first reflector set disposed at an image side of the first optical subsystem for directing light from the first optical subsystem to the optical path selector; and the second reflector set disposed at an image side of the second optical subsystem for directing light from the second optical subsystem to the optical path selector, wherein when the optical path selector is in the light reflection state, the light from the first optical subsystem forms an image on a sensor while the light from the second optical subsystem forms an image on another position rather than on the sensor; and when the optical path selector is in the light passing state, the light from the second optical subsystem forms an image on the sensor while the light from the first optical subsystem forms an image on another position rather than on the sensor.

Moreover, the present invention provides an optical imaging lens system with double optical paths, comprising: the first optical subsystem; the second optical subsystem having a back focal length equal to that of the first optical subsystem; a reflector set disposed at image sides of the first optical subsystem and the second optical subsystem for directing light from the first optical subsystem and light from the second optical subsystem, so that an optical path of the first optical subsystem intersects with an optical path of the second optical subsystem; and a movable optical path selector for reflecting either the light from the first optical subsystem or the light from the second optical subsystem, wherein when the movable optical path selector is disposed at a position where the optical path of the first optical subsystem and the optical path of the second optical subsystem intersect, the light from the first optical subsystem forms an image on a sensor while the light from the second optical subsystem forms an image on another position rather than on the sensor; and when the movable optical path selector is not disposed at the position where the optical path of the first optical subsystem and the optical path of the second optical subsystem intersect, nor at the optical path of the first optical subsystem, nor at the optical path of the second optical subsystem, the light from the second optical subsystem forms an image on the sensor while the light from the first optical subsystem forms an image on another position rather than on the sensor.

By a proper configuration of the reflector sets and the optical path selector, the present invention enables images coming from different lenses to be recorded on the sensor in sequential or alternating order.

BRIEF DESCRIPTION OF THE DRAWINGS

FIG. 3 illustrates an alternative example of the optical path selector in an optical imaging lens system with double optical paths according to a first embodiment of the present invention.

FIG. 5A illustrates a schematic view showing an optical imaging lens system with double optical paths according to a second embodiment of the present invention, wherein an image coming from the first optical subsystem is recorded.

DETAILED DESCRIPTION OF THE PREFERRED EMBODIMENTS

The present invention now will be described more fully hereinafter with reference to the accompanying drawings, in which preferred embodiments of the present invention are shown.

Figure 1A:
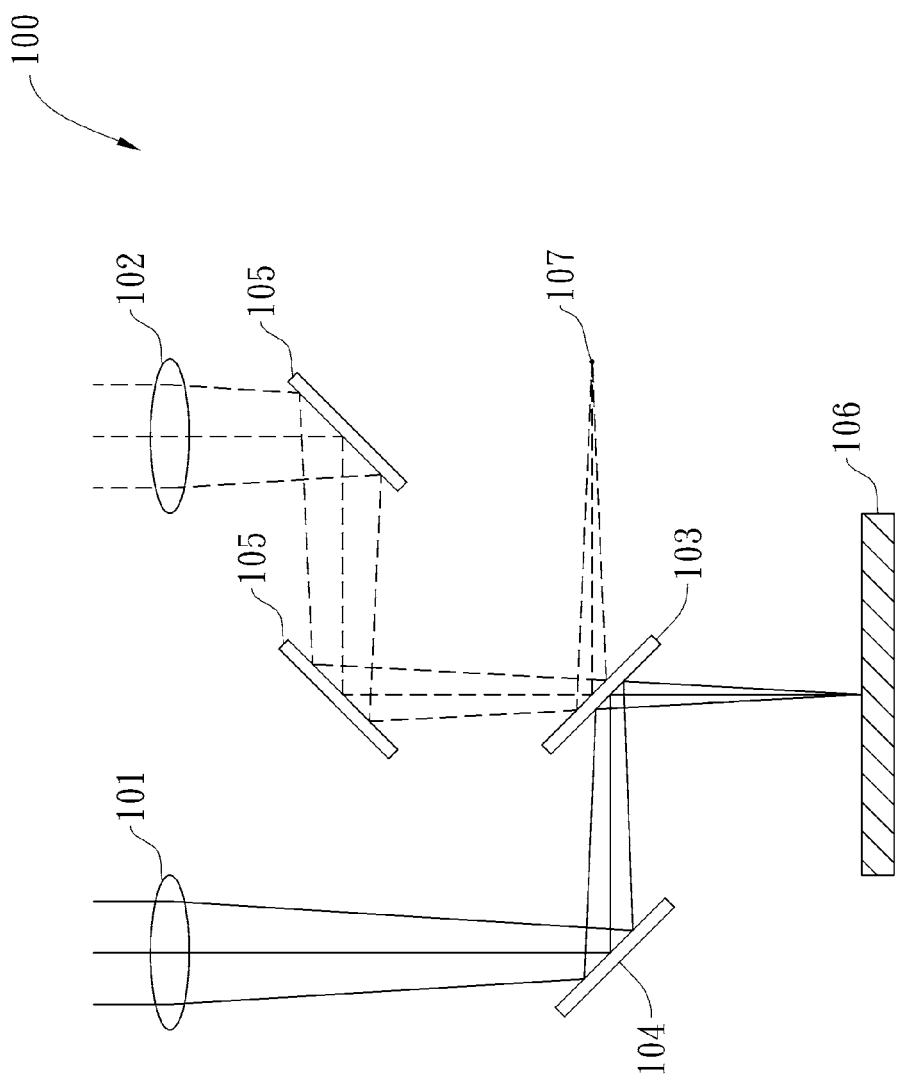
FIG. 1A illustrates a schematic view showing an optical imaging lens system with double optical paths according to a first embodiment of the present invention, wherein an image coming from the first optical subsystem is recorded.
Figure 1B:
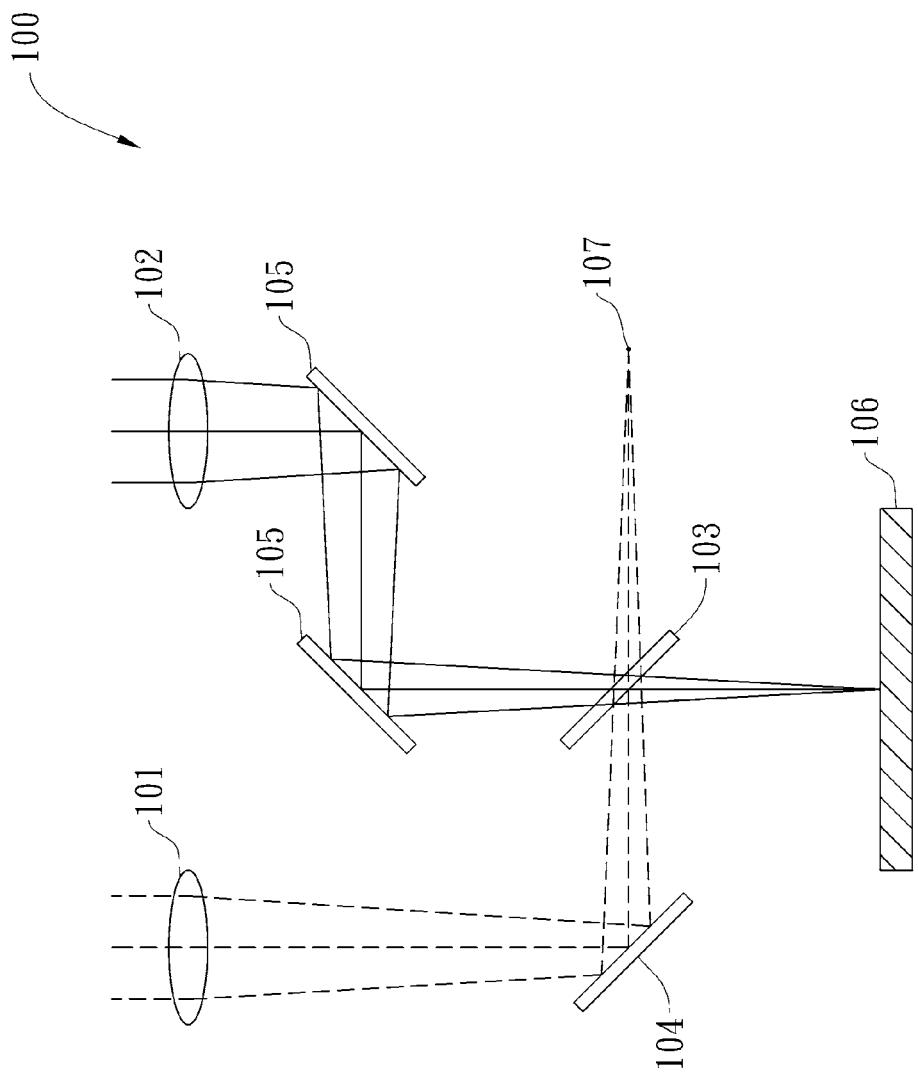
FIG. 1B illustrates a schematic view showing an optical imaging lens system with double optical paths according to a first embodiment of the present invention, wherein an image coming from the second optical subsystem is recorded.

FIG. 1A illustrates a schematic view showing an optical imaging lens system with double optical paths according to a first embodiment of the present invention, wherein an image coming from the first optical subsystem is recorded. FIG. 1B illustrates the system according to the same embodiment of the present invention, wherein an image coming from the second optical subsystem is recorded. In this embodiment, an optical imaging lens system 100 with double optical paths comprises the first optical subsystem 101, the second optical subsystem 102, an optical path selector 103, the first reflector set 104, the second reflector set 105, and a sensor 106. By a proper configuration of the first reflector set 104, the second reflector set 105 and the optical path selector 103, the present invention enables an image coming from the first optical subsystem 101 and an image coming from the second optical subsystem 102 to be recorded on the sensor 106 in sequential or alternating order.

The first optical subsystem 101 and the second optical subsystem 102 may be optical systems with conventional imaging lenses; they are used for receiving light coming from an object to be imaged (not shown). The first reflector set 104 comprising one reflector is disposed at the image side of the first optical subsystem 101 for directing light coming from the first optical subsystem 101 to the optical path selector 103. The second reflector set 105 comprising two reflectors is disposed at the image side of the second optical subsystem 102 for directing light coming from the second optical subsystem 102 to the optical path selector 103. The optical path selector 103 comprises a liquid crystal element composed of liquid crystal molecules and two electrode plates. By selecting the types of liquid crystal molecules and the voltage applied to them, the optical path selector 103 can be controlled to let light pass through or reflect. In the first embodiment of the present invention, when the optical path selector 103 is in the light reflection state, the light from the first optical subsystem 101 is reflected by the optical path selector 103 and forms an image on the sensor 106; meanwhile, the light from the second optical subsystem 102 is reflected by the optical path selector 103 and forms an image on another position 107 rather than on the sensor 106. When the optical path selector 103 is in the light passing state, the light from the second optical subsystem 102 passes through the optical path selector 103 and forms an image on the sensor 106; meanwhile, the light from the first optical subsystem 101 passes through the optical path selector 103 and forms an image on another position 107 rather than on the sensor 106.

FIG. 1A illustrates a schematic view showing an optical imaging lens system with double optical paths according to the first embodiment, wherein an image coming from the first optical subsystem 101 is recorded. In FIG. 1A, the optical path of the first optical subsystem 101 is shown in solid lines, while the optical path of the second optical subsystem 102 is shown in dashed lines; the optical path selector 103 is in the light reflection state. After the first optical subsystem 101 receives light from an object to be imaged (not shown), the light from the first optical subsystem 101 is reflected to the optical path selector 103; since the optical path selector 103 is in the light reflection state, the light from the first optical subsystem 101 is further reflected to the sensor 106 and forms an image thereon. On the other hand, after the second optical subsystem 102 receives light from the object to be imaged (not shown), the light from the second optical subsystem 102 is reflected to the optical path selector 103; since the optical path selector 103 is in the light reflection state, the light from the second optical subsystem 102 is further reflected to another position 107 and forms an image thereon rather than on the sensor 106.

FIG. 1B illustrates a schematic view showing an optical imaging lens system with double optical paths according to the first embodiment, wherein an image coming from the second optical subsystem 102 is recorded. In FIG. 1B, the optical path of the first optical subsystem 101 is shown in dashed lines, while the optical path of the second optical subsystem 102 is shown in solid lines; the optical path selector 103 is in the light passing state. After the second optical subsystem 102 receives light from the object to be imaged (not shown), the light from the second optical subsystem 102 is reflected by the second reflector set 105 and then directed to the optical path selector 103; since the optical path selector 103 is in the light passing state, the light from the second optical subsystem 102 further passes through it and forms an image on the sensor 106. On the other hand, after the first optical subsystem 101 receives light from the object to be imaged (not shown), the light from first optical subsystem 101 is reflected by the first reflector set 104 and then directed to the optical path selector 103; since the optical path selector 103 is in the light passing state, the light from first optical subsystem 101 further passes through it and forms an image on another position 107 rather than on the sensor 106.

It can be seen from the above that, the design of an optical imaging lens system with double optical paths according to the present invention should allow the first optical subsystem 101 and the second optical subsystem 102 to have equal back focal lengths, so that light from both the first optical subsystem 101 and the second optical subsystem 102 can form clear images on the sensor 106.

Figure 2:
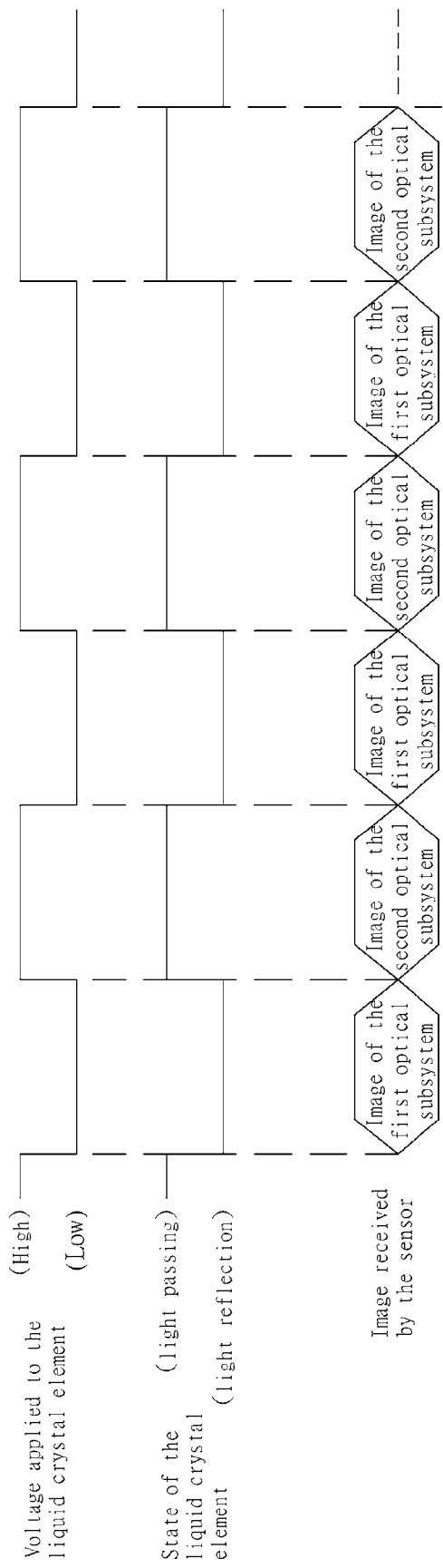
FIG. 2 illustrates a timeline chart showing the state that each component of an optical imaging lens system with double optical paths is in according to a first embodiment of the present invention.

FIG. 2 illustrates a timeline chart showing the state that each component of the optical imaging lens system 100 with double optical paths is in according to the first embodiment of the present invention. As described above, by controlling the voltage applied to it, the optical path selector 103 can let light pass through or reflect light. In this embodiment, when a high voltage is applied to the optical path selector 103, which will be in light passing state; when a low voltage is applied to the optical path selector 103, which will be in light reflection state. The optical imaging lens system 100 with double optical paths of the present invention further comprises a control unit (not shown), which controls whether a high or low voltage is applied to the optical path selector 103. With reference to FIGS. 1A and 1B, in this embodiment, when a low voltage is applied to the optical path selector 103, the optical path selector 103 will be in light reflection state; as a result, the sensor 106 receives an image that comes from the first optical subsystem 101. And when a high voltage is applied to the optical path selector 103, the optical path selector 103 will be in light passing state; as a result, the sensor 106 receives an image that comes from the second optical subsystem 102. By synchronizing the cycle that the optical path selector 103 changes its optical state and the cycle that the sensor 106 is exposed to light, an optical imaging lens system with double optical paths of the present invention enables an image coming from the first optical subsystem 101 and an image coming from the second optical subsystem 102 to be recorded on the sensor 106 in sequential or alternating order. It should be noted that alternatively, by using other types of liquid crystal molecules, a low voltage applied to the optical path selector 103 can cause light to pass through the optical path selector 103, and a high voltage applied to the optical path selector 103 can cause light to be reflected by the optical path selector 103.

From the above, it is known that the optical path selector 103 may be any device which has a light reflection state and a light passing state. FIG. 3 illustrates an alternative example of the optical path selector in an optical imaging lens system with double optical paths according to the first embodiment of the present invention. The optical path selector 103 comprises a disk 303. The disk 303 has five light reflection areas 3031 and five light passing areas 3032, each light reflection area 3031 and each light passing area 3032 being arranged alternately. By rotating the disk 303, light can either pass through the disk 303 or be reflected by it. The light reflection areas 3031 may be mirrors or areas made of reflective materials, and the light passing areas 3032 may be hollowed out areas or made of materials that light can pass through.

Figure 4A:
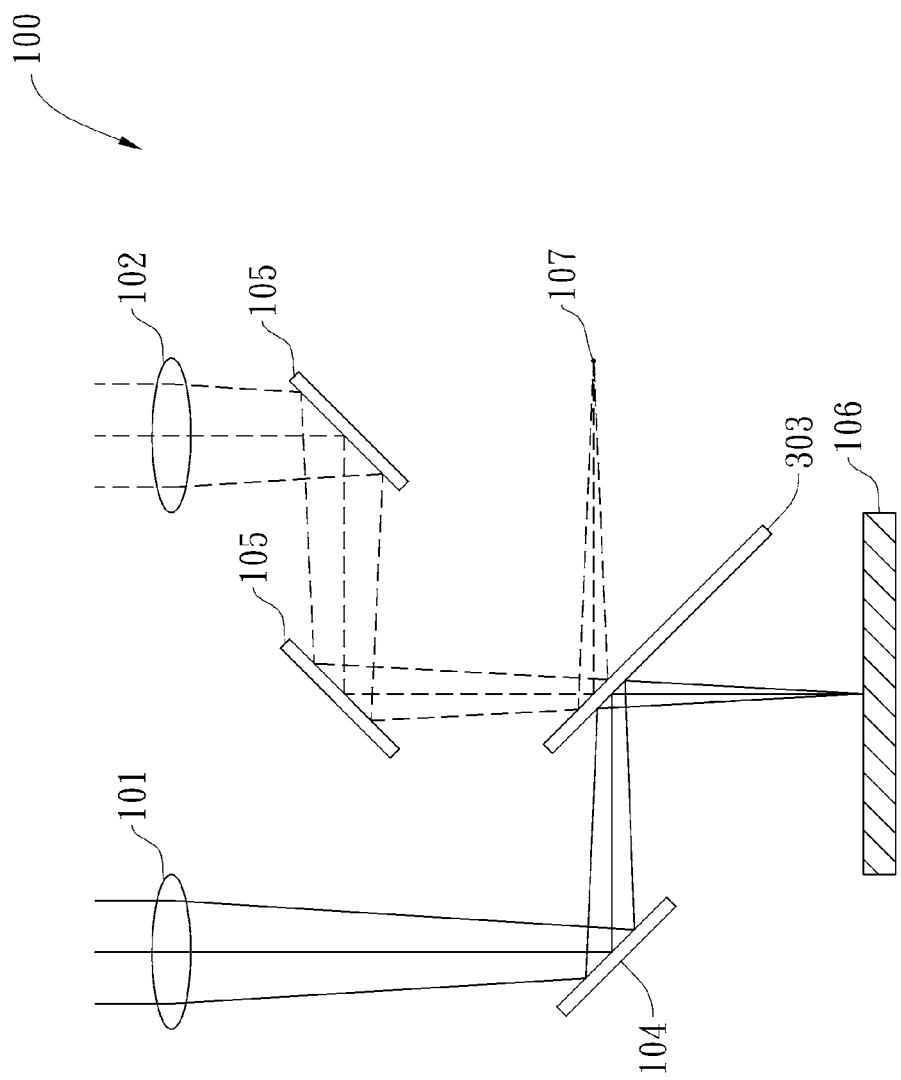
FIG. 4A illustrates a schematic view showing an optical imaging lens system with double optical paths according to an alternative example of the first embodiment of the present invention, wherein an image coming from the first optical subsystem is recorded.

FIG. 4A illustrates a schematic view showing an optical imaging lens system 100 with double optical paths according to an alternative example of the first embodiment of the present invention, wherein an image coming from the first optical subsystem 101 is recorded. In FIG. 4A, the optical path of the first optical subsystem 101 is shown in solid lines, while the optical path of the second optical subsystem 102 is shown in dashed lines. One of the light reflection areas 3031 of the disk 303 is rotated to be placed at the position where the optical path of the first optical subsystem 101 and the optical path of the second optical subsystem 102 intersect; that is, the disk 303 is in the light reflection state. After the first optical subsystem 101 receives light from an object to be imaged (not shown), the light from the first optical subsystem 101 is reflected by the first reflector set 104 and directed to the disk 303; since the disk 303 is in the light reflection state, the light from the first optical subsystem 101 is further reflected by the disk 303, directed to the sensor 106 and forms an image thereon. On the other hand, after the second optical subsystem 102 receives light from the object to be imaged (not shown), the light from the second optical subsystem 102 is reflected by the second reflector set 105 and directed to the disk 303; since the optical disk 303 is in the light reflection state, the light from the second optical subsystem 102 is further reflected by the disk 303, directed to another position 107 and forms an image thereon rather than on the sensor 106.

Figure 4B:
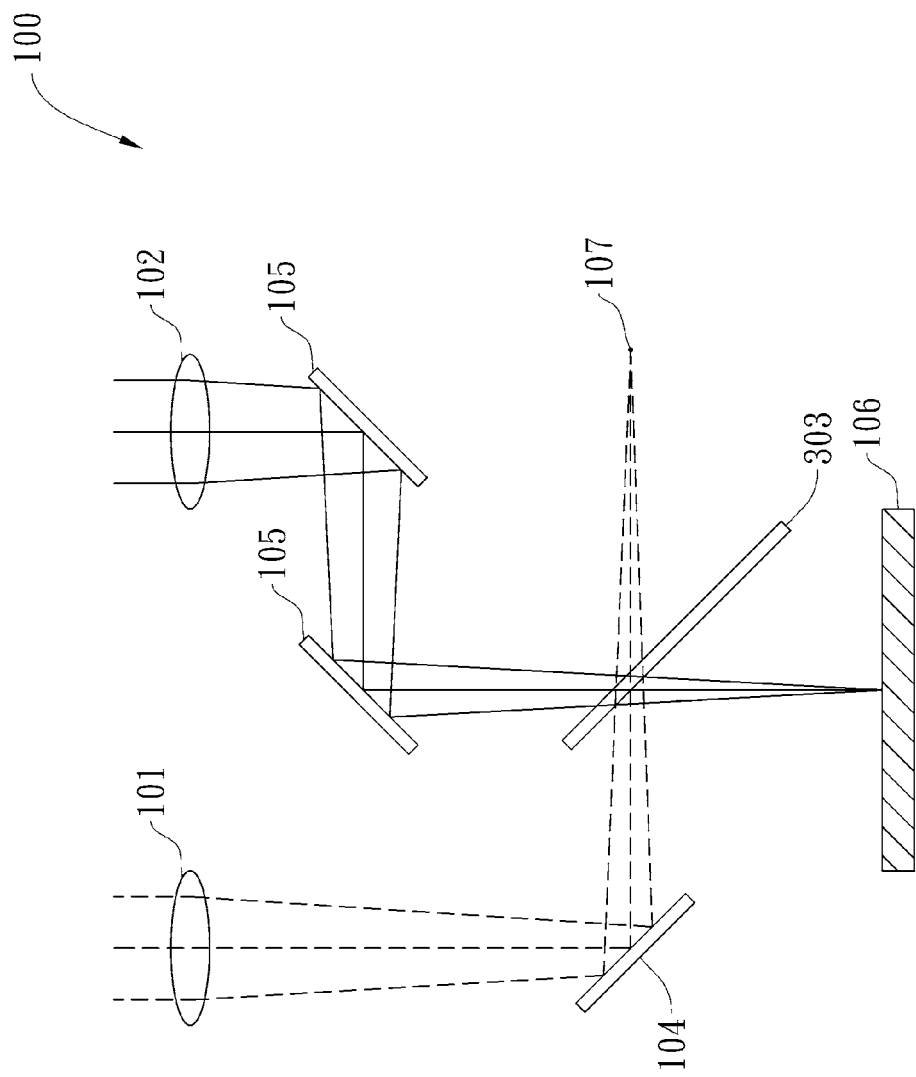
FIG. 4B illustrates a schematic view showing an optical imaging lens system with double optical paths according to an alternative example of the first embodiment of the present invention, wherein an image coming from the second optical subsystem is recorded.

FIG. 4B illustrates a schematic view showing an optical imaging lens system 100 with double optical paths according to an alternative example of the first embodiment of the present invention, wherein an image coming from the second optical subsystem 102 is recorded. In FIG. 4B, the optical path of the first optical subsystem 101 is shown in dashed lines, while the optical path of the second optical subsystem 102 is shown in solid lines. One of the light passing areas 3032 of the disk 303 is rotated to be placed at the position where the optical path of the first optical subsystem 101 and the optical path of the second optical subsystem 102 intersect; that is, the disk 303 is in the light passing state. After the second optical subsystem 102 receives light from an object to be imaged (not shown), the light from the second optical subsystem 102 is reflected by the second reflector set 105 and directed to the disk 303; since the disk 303 is in the light passing state, the light from second optical subsystem 102 passes through the disk 303 and forms an image on the sensor 106. On the other hand, after the first optical subsystem 101 receives light from the object to be imaged (not shown), the light from the first optical subsystem 101 is reflected by the first reflector set 104 and directed to the disk 303; since the optical disk 303 is in the light passing state, the light from the first optical subsystem 101 passes through the disk 303 and forms an image on another position 107 rather than on the sensor 106. The cycle that the disk 303 changes its optical state and the cycle that the sensor 106 is exposed to light can be synchronized by adjusting the angular velocity of the disk 303. By synchronizing the two cycles, an image coming from the first optical subsystem 101 and an image coming from the second optical subsystem 102 can be recorded on the sensor 106 in sequential or alternating order.

Figure 5B:
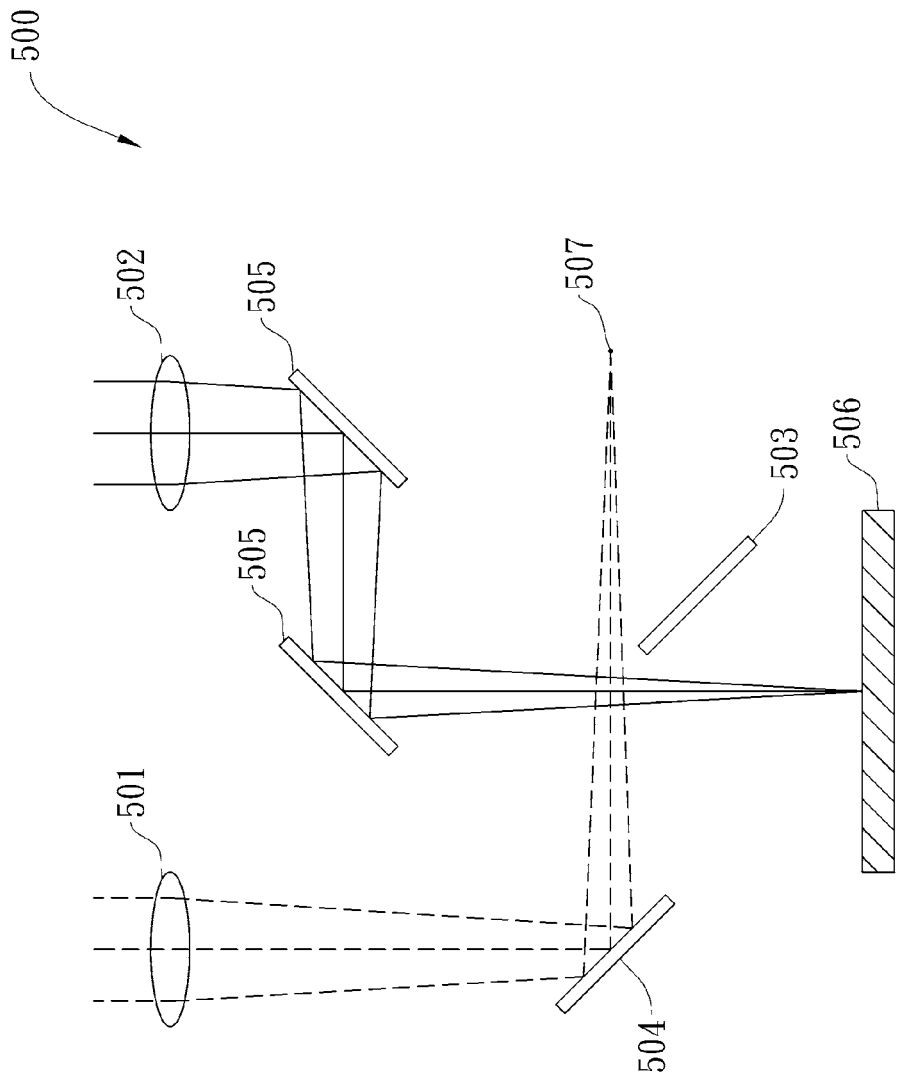
FIG. 5B illustrates a schematic view showing an optical imaging lens system with double optical paths according to a second embodiment of the present invention, wherein an image coming from the second optical subsystem is recorded.

FIG. 5A illustrates a schematic view showing an optical imaging lens system with double optical paths according to the second embodiment of the present invention, wherein an image coming from the first optical subsystem is recorded. FIG. 5B illustrates the system according to the same embodiment of the present invention, wherein an image coming from the second optical subsystem is recorded. In this embodiment, an optical imaging lens system 500 with double optical paths comprises the first optical subsystem 501, the second optical subsystem 502, a movable optical path selector 503, the first reflector set 504, the second reflector set 505, and a sensor 506. By a proper configuration of the first reflector set 504, the second reflector set 505 and the movable optical path selector 503, the present invention enables an image coming from the first optical subsystem 501 and an image coming from the second optical subsystem 502 to be recorded on the sensor 506 in sequential or alternating order.

The first optical subsystem 501 and the second optical subsystem 502 may be optical systems with conventional imaging lenses; they are used for receiving light coming from an object (not shown) to be imaged. The first reflector set 504 comprising one reflector is disposed at the image side of the first optical subsystem 501 for directing light coming from the first optical subsystem 501. The second reflector set 505 comprising two reflectors is disposed at the image side of the second optical subsystem 502 for directing light coming from the second optical subsystem 502. Moreover, the configuration of the first reflector set 504 and the second reflector set 505 makes the optical path of the first optical subsystem 501 and the optical path of the second optical subsystem 502 intersect. The movable optical path selector 503 comprises a reflector for reflecting light from the first optical subsystem 501 or light from the second optical subsystem 502. In this embodiment, when the movable optical path selector 503 is disposed at the position where the optical path of the first optical subsystem 501 and the optical path of the second optical subsystem 502 intersect, the light from the first optical subsystem 501 is reflected by the movable optical path selector 503 and further forms an image on the sensor 506, while the light from the second optical subsystem 502 is reflected by the movable optical path selector 503 and further forms an image on another position 507 rather than on the sensor 506. When the movable optical path selector 503 is not disposed at the position where the optical path of the first optical subsystem 501 and the optical path of the second optical subsystem 502 intersect, nor at the optical path of the first optical subsystem 501, nor at the optical path of the second optical subsystem 502, the light from the second optical subsystem 502 forms an image on the sensor 506 while the light from the first optical subsystem 501 forms an image on another position 507 rather than on the sensor 506.

FIG. 5A illustrates a schematic view showing an optical imaging lens system with double optical paths according to the second embodiment, wherein an image coming from the first optical subsystem 501 is recorded. In FIG. 5A, the optical path of the first optical subsystem 501 is shown in solid lines, while the optical path of the second optical subsystem 502 is shown in dashed lines. The movable optical path selector 503 is disposed at the position where the optical path of the first optical subsystem 501 and the optical path of the second optical subsystem 502 intersect. After the first optical subsystem 501 receives light from an object to be imaged (not shown), the light from the first optical subsystem 501 is reflected by the first reflector set 504 and directed to the movable optical path selector 503. As a result, the light from the first optical subsystem 501 is further reflected by the movable optical path selector 503 and forms an image on the sensor 506. On the other hand, after the second optical subsystem 502 receives light from the object to be imaged (not shown), the light from the second optical subsystem 502 is reflected by the second reflector set 505 and directed to the movable optical path selector 503. As a result, the light from the second optical subsystem 502 is further reflected by the movable optical path selector 503 and forms an image on another position 507 rather than on the sensor 506.

FIG. 5B illustrates a schematic view showing an optical imaging lens system with double optical paths according to the second embodiment, wherein an image coming from the second optical subsystem 502 is recorded. In FIG. 5B, the optical path of the first optical subsystem 501 is shown in dashed lines, while the optical path of the second optical subsystem 502 is shown in solid lines. The movable optical path selector 503 is not disposed at the position where the optical path of the first optical subsystem 501 and the optical path of the second optical subsystem 502 intersect, nor at the optical path of the first optical subsystem 501, nor at the optical path of the second optical subsystem 502. After the first optical subsystem 501 receives light from an object to be imaged (not shown), the light from the first optical subsystem 501 is reflected by the first reflector set 504 and directed to another position 507 rather than to the sensor 506. On the other hand, after the second optical subsystem 502 receives light from the object to be imaged (not shown), the light from the second optical subsystem 502 is reflected by the second reflector set 505 and directed to the sensor 506.

It can be seen from the above that, the design of an optical imaging lens system with double optical paths according to the present invention should allow the first optical subsystem 501 and the second optical subsystem 502 to have equal back focal lengths, so that light from both the first optical subsystem 501 and the second optical subsystem 502 can form clear images on the sensor 506. In an optical imaging lens system with double optical paths of the present invention, the cycle that the movable optical path selector 503 changes its position and the cycle that the sensor 506 is exposed to light can be synchronized by adjusting the moving speed of the movable optical path selector 503. By synchronizing the two cycles, an image coming from the first optical subsystem 501 and an image coming from the second optical subsystem 502 can be recorded on the sensor 506 in sequential or alternating order.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. An optical imaging lens system with double optical paths, comprising:
    a first optical subsystem;
    a second optical subsystem having a back focal length equal to that of the first optical subsystem;
    an optical path selector selectively having either a light reflection state or a light passing state at any given time;
    a first reflector set disposed at an image side of the first optical subsystem for directing light from the first optical subsystem to the optical path selector;
    a second reflector set disposed at an image side of the second optical subsystem for directing light from the second optical subsystem to the optical path selector, and
    a sensor for receiving images coming from the first optical subsystem and the second optical subsystem in sequential, alternating order;
    wherein when the optical path selector is in the light reflection state, the light from the first optical subsystem forms an image on the sensor while the light from the second optical subsystem forms an image on another position rather than on the sensor; and when the optical path selector is in the light passing state, the light from the second optical subsystem forms an image on the sensor while the light from the first optical subsystem forms an image on another position rather than on the sensor.

2. The optical imaging lens system with double optical paths according to claim 1, wherein a cycle that the optical path selector changes its state synchronizes with a cycle that the sensor is exposed to light.

3. The optical imaging lens system with double optical paths according to claim 1, wherein the optical path selector comprises a liquid crystal element.

4. The optical imaging lens system with double optical paths according to claim 1, wherein the optical path selector comprises a disk having at least one light passing area and at least one light reflection area, each of the at least one light passing area and each of the at least one light reflection area being arranged alternately.

5. An optical imaging lens system with double optical paths, comprising:
    a first optical subsystem;
    a second optical subsystem having a back focal length equal to that of the first optical subsystem;
    a reflector set disposed at image sides of the first optical subsystem and the second optical subsystem for directing light from the first optical subsystem and light from the second optical subsystem both, so that an optical path of the first optical subsystem intersects with an optical path of the second optical subsystem; and
    a movable optical path selector for reflecting either the light from the first optical subsystem or the light from the second optical subsystem onto a sensor at any given time;
    wherein when the movable optical path selector is disposed at a position where the optical path of the first optical subsystem and the optical path of the second optical subsystem intersect, the light from the first optical subsystem forms an image on the sensor while the light from the second optical subsystem forms an image on another position rather than on the sensor; and when the movable optical path selector is not disposed at the position where the optical path of the first optical subsystem and the optical path of the second optical subsystem intersect, nor at the optical path of the first optical subsystem, nor at the optical path of the second optical subsystem, the light from the second optical subsystem forms an image on the sensor while the light from the first optical subsystem forms an image on another position rather than on the sensor.

6. The optical imaging lens system with double optical paths according to claim 5, wherein a cycle that the optical path selector changes its position synchronizes with a cycle that the sensor is exposed to light.

7. The optical imaging lens system with double optical paths according to claim 5, wherein the optical path selector comprises a reflector.

* * * * *